(12) United States Patent
Horn et al.

(10) Patent No.: US 8,489,749 B2
(45) Date of Patent: Jul. 16, 2013

(54) UNICAST/MULTICAST MEDIA EDGE PROXY WITH FAST CHANNEL SWITCHING

(75) Inventors: Uwe Horn, Aachen (DE); Thorsten Lohmar, Aachen (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 6 days.

(21) Appl. No.: 12/439,385

(22) PCT Filed: Aug. 27, 2007

(86) PCT No.: PCT/IB2007/002458
§ 371 (c)(1),
(2), (4) Date: Feb. 27, 2009

(87) PCT Pub. No.: WO2008/029230
PCT Pub. Date: Mar. 13, 2008

(65) Prior Publication Data
US 2010/0017463 A1 Jan. 21, 2010

Related U.S. Application Data

(60) Provisional application No. 60/824,144, filed on Aug. 31, 2006.

(51) Int. Cl.
| | | |
|---|---|---|
| G06F 15/177 | (2006.01) | |
| G06F 15/173 | (2006.01) | |
| G06F 15/16 | (2006.01) | |
| H04N 7/173 | (2011.01) | |
| H04L 29/06 | (2006.01) | |

(52) U.S. Cl.
CPC .................................... *H04L 29/06* (2013.01)

USPC ........... 709/227; 709/220; 709/226; 709/231; 725/116

(58) Field of Classification Search
USPC .................. 709/231, 228, 227; 370/486, 489
See application file for complete search history.

(56) References Cited

U.S. PATENT DOCUMENTS

| | | | | |
|---|---|---|---|---|
| 7,688,861 | B2 * | 3/2010 | Sidana ........................ | 370/486 |
| 2002/0059592 | A1 * | 5/2002 | Kiraly .......................... | 725/37 |
| 2002/0150094 | A1 * | 10/2002 | Cheng et al. ................. | 370/389 |
| 2002/0168178 | A1 * | 11/2002 | Rodriguez et al. ............ | 386/92 |
| 2005/0081244 | A1 * | 4/2005 | Barrett et al. ................ | 725/97 |
| 2006/0200576 | A1 * | 9/2006 | Pickens et al. ............... | 709/231 |
| 2006/0222323 | A1 * | 10/2006 | Sharpe et al. ................ | 386/68 |

FOREIGN PATENT DOCUMENTS

EP 1 523 190 A 4/2005

\* cited by examiner

*Primary Examiner* — Peter Shaw

(57) ABSTRACT

A system, method, and media edge proxy, MEP, (17) for providing media data such as Internet Protocol Television, IPTV, or Internet radio channels to a media client (12). The MEP obtains the media data from a media server (18) utilizing a temporary unicast connection and provides the media data obtained from the server to the media client for an initial time period. Upon determining that the initial time period has expired, the MEP obtains the media data via multicast from a multicast router (27), provides the media data obtained from the router to the media client, and releases the temporary unicast connection. The invention reduces channel switching delay and thus improves quality-of-experience for the end-user. The invention also avoids excessive IGMP JOIN/LEAVE signaling when a user switches quickly through channels.

15 Claims, 5 Drawing Sheets

UNICAST/MULTICAST MEDIA EDGE PROXY WITH FAST CHANNEL SWITCHING

This application is the National Stage of International Application No. PCT/IB07/02458, filed Aug. 27, 2007, which claims the benefit of U.S. Provisional Application No. 60/824,144, filed Aug. 31, 2006, the disclosures of which are fully incorporated herein by reference.

TECHNICAL FIELD OF THE INVENTION

The present invention relates generally to communications networks, and in particular, to the delivery of media data such as television (TV) channels to TV sets connected to an Internet Protocol (IP) network.

DESCRIPTION OF RELATED ART

Internet Protocol Television (IPTV) enables Set-Top-Boxes (STBs) connected to an IP network to obtain delivery of TV channels and to access video content through the IP network. IP provides two delivery mechanisms: unicast and multicast. Unicast is more appropriate for Video-on-Demand (VoD) services, while multicast is more efficient for delivering TV channels.

In the Internet draft by T. Einarsson, et al., "Multiple aggregated control URIs for RTSP", IETF Draft, June 2006, it was shown that fast channel switching is feasible over unicast. However, an IPTV solution using unicast for delivering TV channels will not scale with the number of users and is thus not feasible. While multicast is the right choice for delivering live TV channels to multiple users, it has the drawback of requiring the processing of Internet Group Management Protocol (IGMP) JOIN/LEAVE commands for channel switching, and this processing introduces delays and network-resource problems.

Accordingly, there is a need for an improved system and method of delivering media data such as TV channels over an IP network. The present invention provides such a system and method together with a media edge proxy.

SUMMARY OF THE INVENTION

The present invention provides a media edge proxy which combines the advantages of unicast for fast channel switching with the advantages of multicast as an efficient channel distribution mechanism. The invention reduces the channel switching delay and thus improves quality-of-experience for the end-user. The invention also avoids excessive IGMP JOIN/LEAVE signaling when a user switches quickly through channels.

Thus in one aspect, the present invention is directed to a method of providing media channels to a media client. The method includes the steps of receiving from the media client, a request for media data from an identified media channel; obtaining the media data from a media server utilizing a temporary unicast connection; and providing the media data received from the server to the media client for an initial time period. Upon determining that the initial time period has expired, the method includes obtaining the media data from a multicast router; providing the media data received from the router to the media client; and releasing the temporary unicast connection with the media server. The media channels may be, for example, IPTV or Internet radio channels.

In another aspect, the present invention is directed to a media edge proxy for providing media channels to a media client. The media edge proxy includes a channel switch interface for receiving from the media client, a request for media data from an identified media channel; a unicast interface for receiving the requested media data from a media server; a multicast interface for receiving the requested media data from a multicast router; and a controlling proxy unit connected to the channel switch interface, the unicast interface, and the multicast interface. The controlling proxy unit is adapted to obtain the requested media data from the media server utilizing a temporary unicast connection; and provide the requested media data received from the server to the media client for an initial time period. Upon determining that the initial time period has expired, the controlling proxy unit obtains the media data from the multicast router; provides the requested media data received from the router to the media client; and releases the temporary unicast connection with the server.

In another aspect, the present invention is directed to a system for providing requested media data to a media client. The system includes a media server for providing the requested media data utilizing a temporary unicast connection; a multicast router for providing the requested media data utilizing a multicast connection; and a media edge proxy for controlling delivery of the requested media data to the media client. The media edge proxy includes a unicast interface for receiving the requested media data from the media server utilizing the temporary unicast connection; a multicast interface for receiving the requested media data from the multicast router utilizing the multicast connection; a channel switch interface for sending the requested media data to the media client; and a controlling proxy unit connected to the unicast interface, the multicast interface, and the channel switch interface. The controlling proxy unit is adapted to obtain the requested media data from the media server utilizing a temporary unicast connection; and provide the requested media data received from the server to the media client for an initial time period. Upon determining that the initial time period has expired, the controlling proxy unit obtains the media data from the multicast router; provides the requested media data received from the router to the media client; and releases the temporary unicast connection with the server.

DETAILED DESCRIPTION OF EMBODIMENTS

The present invention provides a media edge proxy which combines the advantages of unicast for fast channel switching with the advantages of multicast as an efficient channel distribution mechanism. Although the invention is described herein primarily in terms of IPTV channels, the invention is applicable to other types of media channels such as Internet radio channels and the like.

Figure 1:
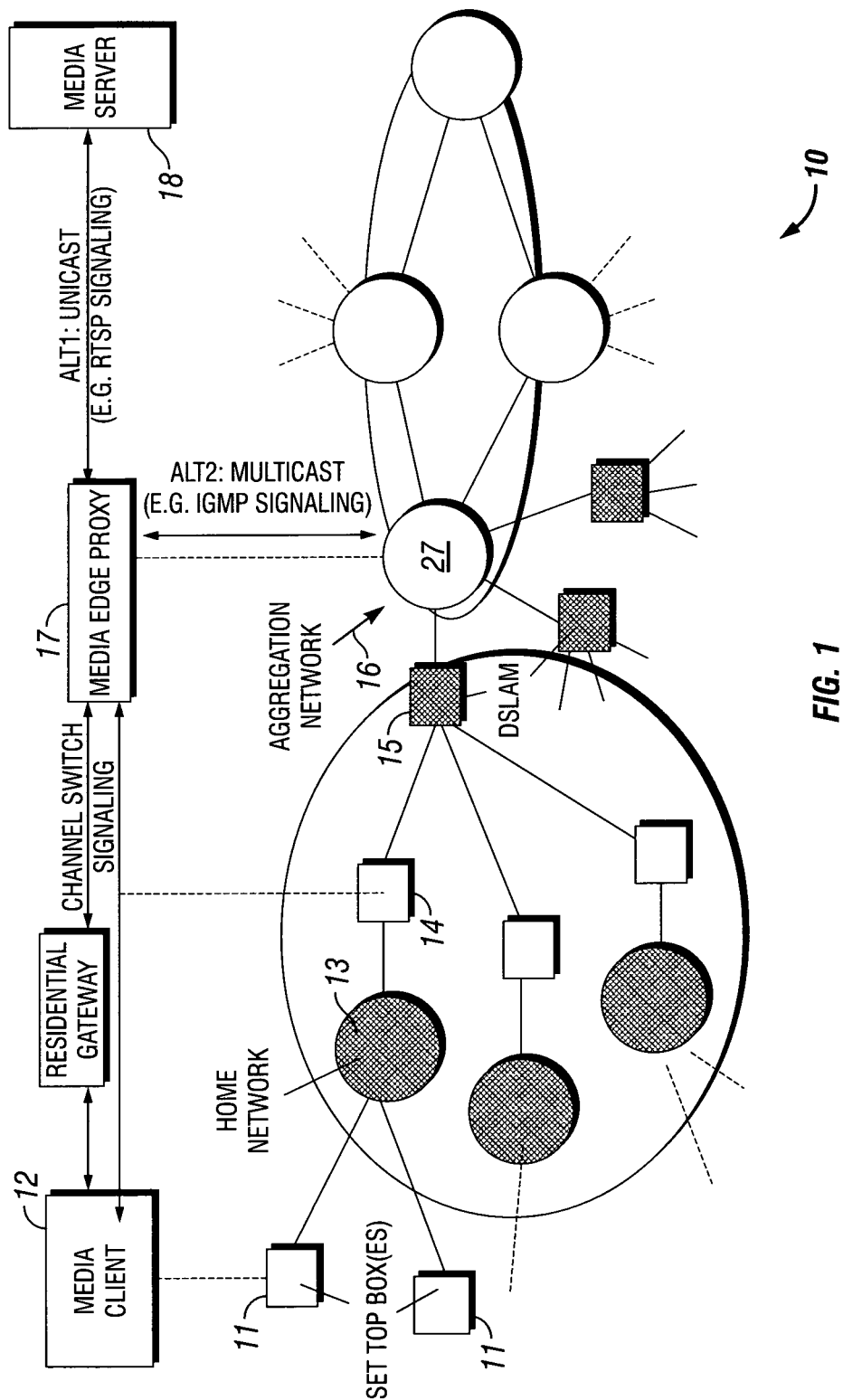
FIG. 1 is a simplified block diagram of an IP-network architecture suitable for delivering IPTV channels to IPTV Set-Top-Boxes (STBs) in accordance with exemplary embodiments of the system of the present invention.

FIG. 1 is a simplified block diagram of an IP-network architecture 10 suitable for delivering IPTV channels to IPTV Set-Top-Boxes (STBS) 11 in accordance with exemplary embodiments of the system of the present invention. The STBs include a media client 12, and multiple STBs may connect to a home network 13. The home network connects through a Residential Gateway (GW) 14 to a Digital Subscriber Line Access Multiplexer (DSLAM) 15. The DSLAM connects to an aggregation network 16 via a nearby Media Edge Proxy (MEP) 17.

When a user activates television reception, the IPTV STB 11 establishes a control connection to the MEP 17 over unicast, either directly with the MEP or indirectly via the Residential GW 14. In the following description, the term "STB/GW" is used to indicate from the perspective of the MEP, either a direct connection from the STB or a connection from the STB via the Residential GW. Typically the Real-Time Streaming Protocol (RTSP) is used for controlling the unicast connection, but other protocols suitable for connection control, such as the Session Initiation Protocol (SIP), may be utilized as well. Without limiting the present invention, RTSP is discussed in the following exemplary description.

When the STB/GW connects via RTSP to the MEP 17, the MEP establishes a unicast connection to a media server 18. Without loss of generality, FIG. 1 also shows the use of RTSP between the MEP and the media server, although other protocols such as SIP may be utilized as well. The STB/GW then requests a channel. This may be accomplished, for example, by utilizing RTSP PLAY requests inside an RTSP session to request a new TV channel (content source) via the RTSP front end in the media server. The MEP 17 checks whether the requested channel is locally available on a multicast channel. If yes, the MEP starts forwarding packets to the media client 12 over the already established unicast connection as soon as the MEP receives multicast packets of the requested channel.

If the requested channel is not locally available on a multicast channel, the MEP 17 requests the channel from the media server over a unicast RTSP connection. While requesting the channel via RTSP from the media server 18, the MEP also sends an IGMP JOIN request message to a Multicast Router 27 requesting a multicast connection for the requested channel. An IGMP JOIN inhibit timer triggers the IGMP JOIN request message only if the requested channel has been delivered to the STB 11 via the unicast connection for more than a predefined period of time (for example, 30 seconds). As soon as the requested channel becomes available over multicast, the MEP starts forwarding the packets to the STB and tells the media server 18 to release the unicast connection and stop sending data.

If the STB 11 stops using a channel, it sends a request to the MEP 17. The MEP immediately stops forwarding the media packets belonging to that channel. If an IGMP JOIN request was issued previously, the MEP sends an IGMP LEAVE request to the Multicast Router 27. An IGMP LEAVE inhibit timer triggers the LEAVE request only if the channel has not been requested by the same media client over a longer period of time (for example, 5 minutes). If channel data was received from the media server 18 via unicast, a STOP command is sent to the media server.

Figure 2:
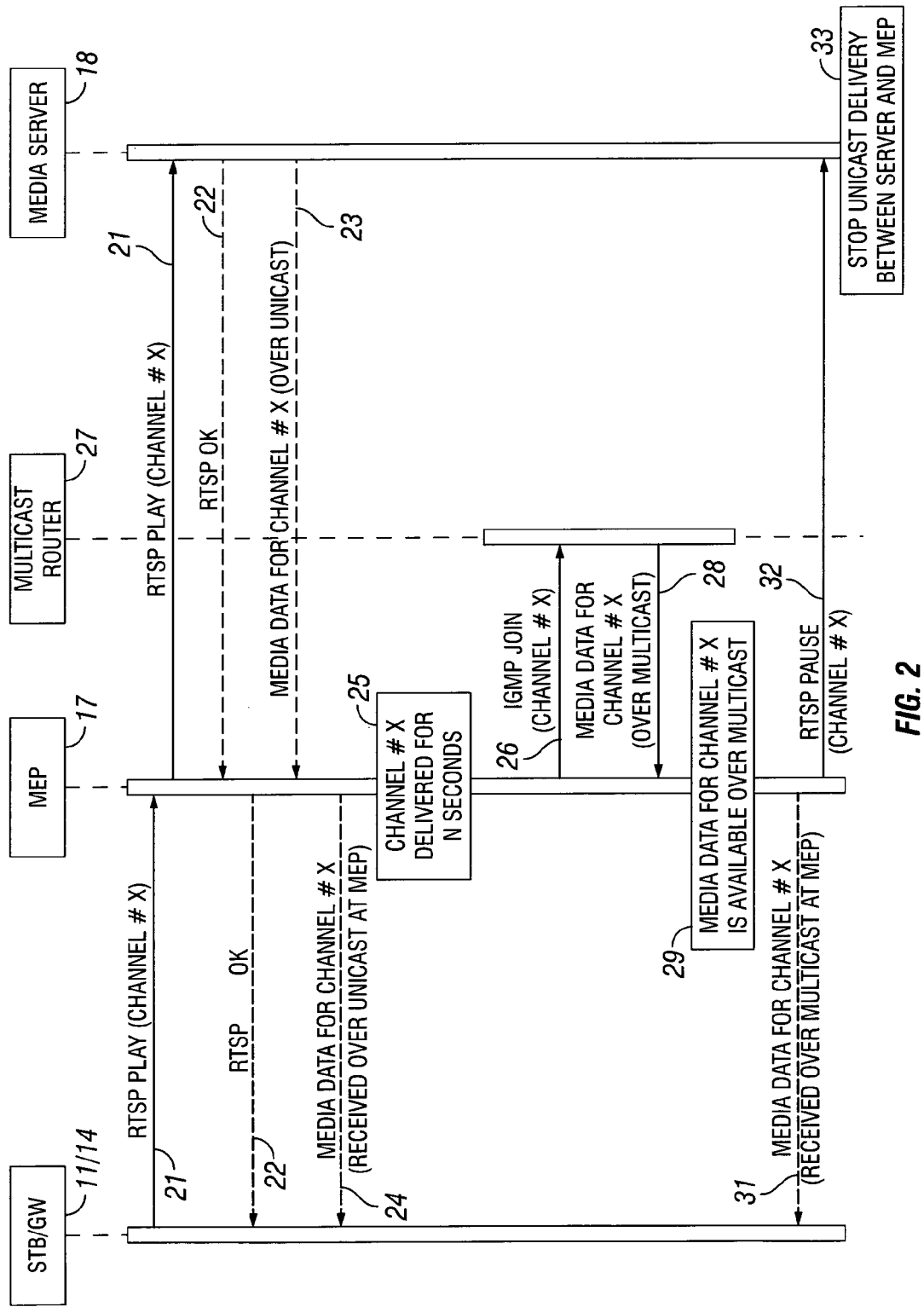
FIG. 2 is a message sequence diagram illustrating an embodiment of the method of the present invention in which an STB or a Residential Gateway requests a channel, which is not currently available over multicast at the Media Edge Proxy (MEP)

FIG. 2 is a message sequence diagram illustrating an embodiment of the method of the present invention in which an STB 11 or a Residential GW 14 requests a channel, which is not currently available over multicast at the MEP 17. It is assumed that an RTSP session has been established already between the STB and the MEP and between the MEP and the media server by using the well known sequence of RTSP SETUP messages. The invention provides a temporary unicast connection to give quick access to TV channels requested by a media client, and then rolls over from unicast to multicast reception as soon as possible to avoid excessive usage of unicast resources.

The STB/GW sends an RSTP PLAY message 21 to the MEP 17, which forwards the message to the Media Server 18. The RSTP PLAY message identifies a requested channel (channel #x). The Media Server returns an RSTP OK message 22, which the MEP forwards to the STB/GW. At 23, the Media Server then sends media data for channel #x over unicast to the MEP. At 24, the MEP forwards the media data, which was received over unicast from the media server, to the STB 11. After a predefined time period, the MEP determines at 25 that channel #x has been delivered for N seconds. The MEP then sends an IGMP JOIN request message 26 identifying channel #x to the Multicast Router 27. At 28, the Multicast Router begins forwarding the media data to the MEP over multicast. The receipt of the media data indicates to the MEP at 29 that channel #x is available over multicast, and at 31, the MEP begins forwarding the media data, which was received via multicast from the multicast router, to the STB 11. At 32, the MEP sends an RTSP PAUSE message identifying channel #x to the Media Server. At 33, unicast delivery of the media data between the Media Server and the MEP is stopped.

Figure 3:
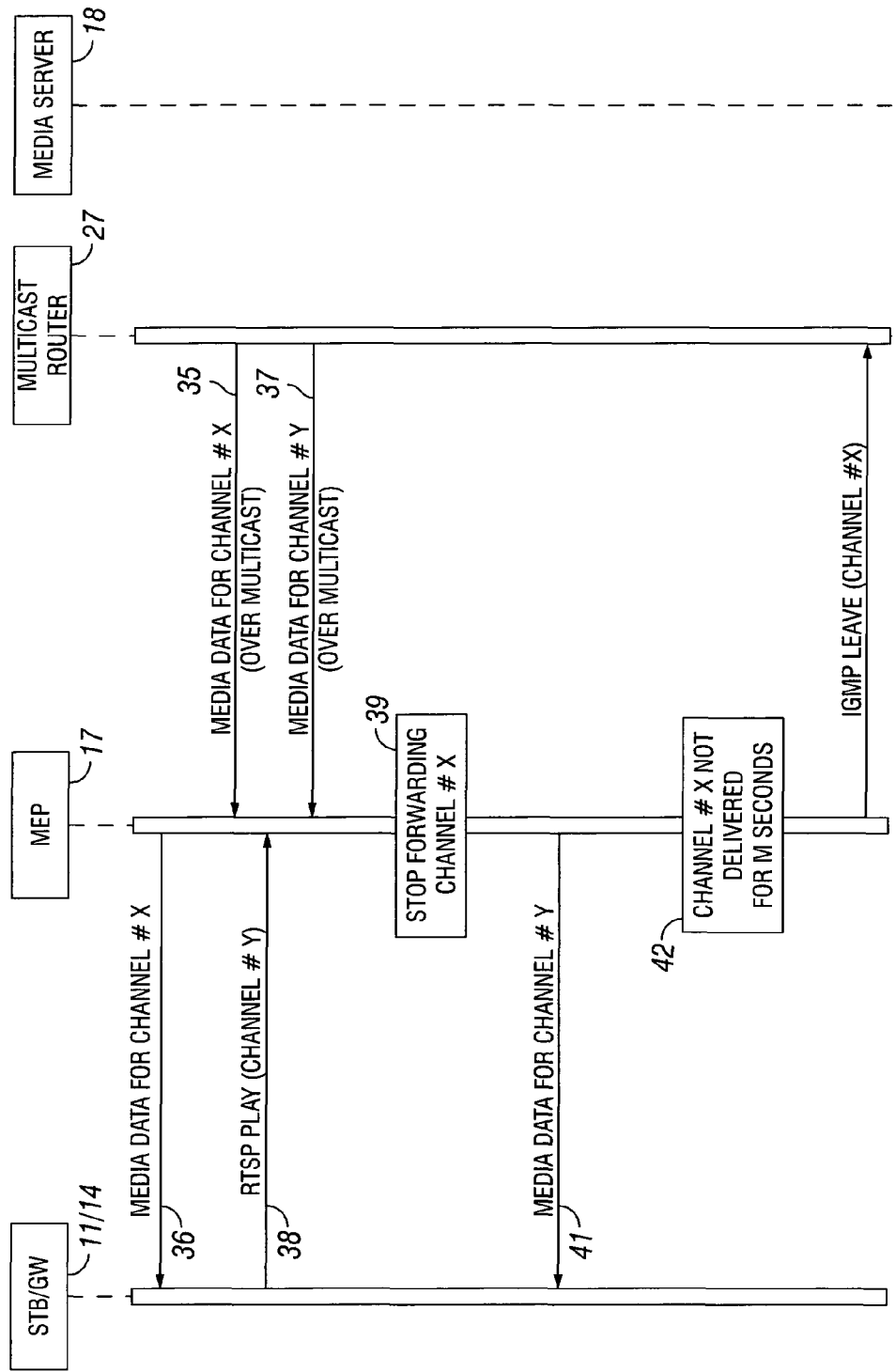
FIG. 3 is a message sequence diagram illustrating an embodiment of the method of the present invention in which the STB receives a first channel and switches to a second channel.

FIG. 3 is a message sequence diagram for the case in which the STB 11 receives a first channel (channel #x) and switches to a second channel (channel #y). It is assumed that channel #y is available over multicast in this case. Otherwise, the message sequence shown in FIG. 2 is used to give quick access to channel #y via an RTSP unicast connection.

At 35, the Multicast Router 27 is forwarding media data for channel #x over multicast to the MEP 17. At 36, the MEP forwards the media data for channel #x received over multicast to the STB 11. At 37, the Multicast Router also forwards media data for channel #y to the MEP. In certain situations channel #y is available at the MEP although the STB has not requested it. The system may have been configured such that all channels are always broadcasted in the backbone, or another STB may have previously requested channel #y. At 38, the STB sends an RTSP PLAY message to the MEP requesting channel #y. At 39, the MEP stops forwarding media data for channel #x to the STB, and at 41, the MEP starts forwarding media data for channel #y to the STB 11. After a predefined time period, the MEP determines at 42 that channel #x has not been delivered for M seconds. The MEP then sends an IGMP LEAVE request message 43 identifying channel #x to the Multicast Router.

Figure 4:
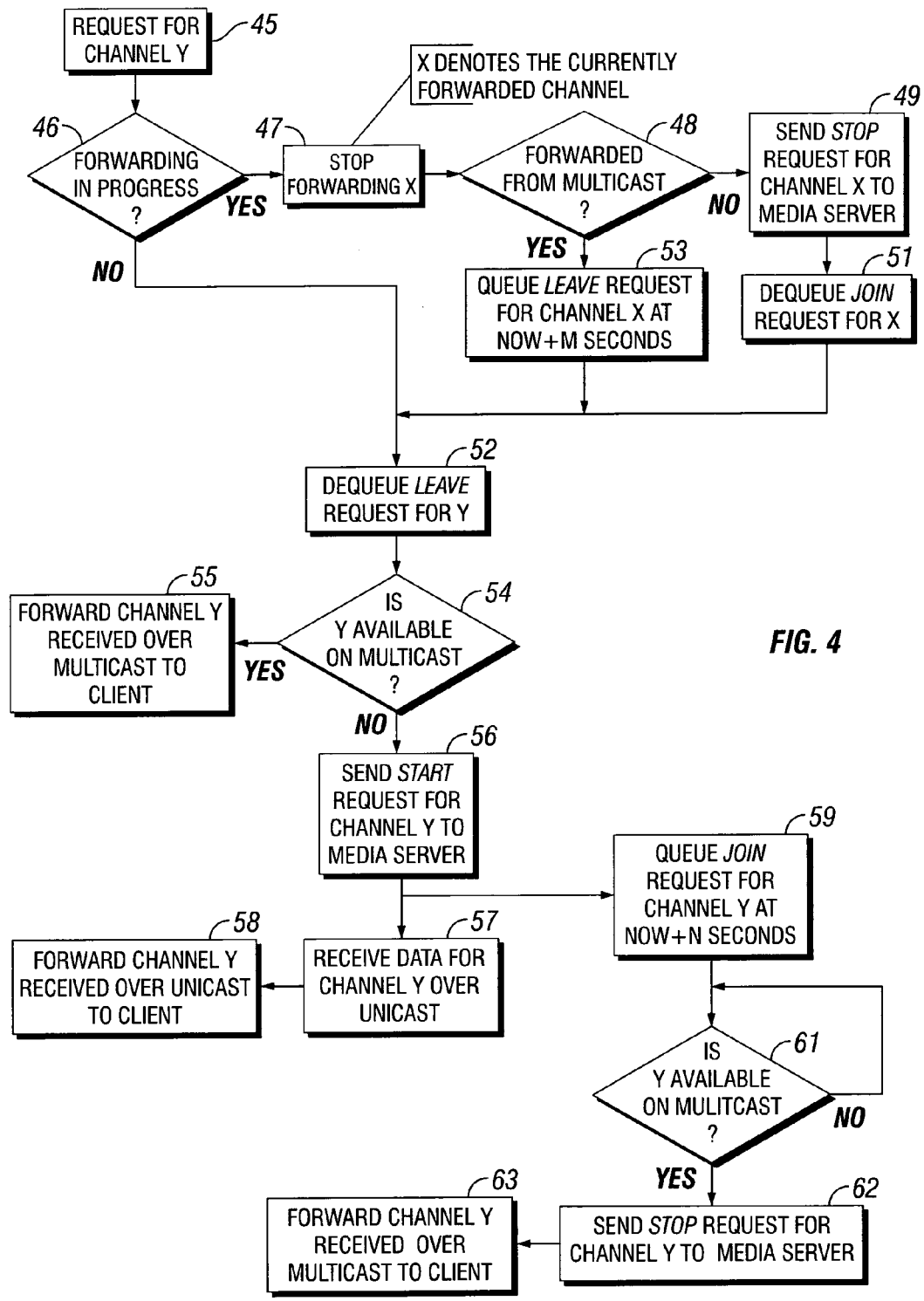
FIG. 4 is a flow diagram illustrating the steps of an exemplary embodiment of the method of the present invention as executed by a unicast/multicast proxy function at the MEP.

FIG. 4 is a flow diagram illustrating the steps of an exemplary embodiment of the method of the present invention, as executed by a unicast/multicast proxy function at the MEP. In this example, channel #x is currently being forwarded to the STB 11 when the user enters a request for channel #y. LEAVE and JOIN requests are entered into a timer queue. Entries in this queue are de-queued and executed when an associated timer expires. By de-queuing an entry, the associated timer is canceled. The use of special logic and inhibit timers prevents the sending of IGMP JOIN/LEAVE messages when a user rapidly changes channels because only the unicast connection is used during rapid channel changes.

At step 45, the MEP 17 receives a request for channel #y from the STB 11. At step 46, it is determined whether or not forwarding of another channel, such as channel #x, is already in progress. If so, the method moves to step 47 where the MEP stops forwarding media data for channel #x. At step 48, it is determined whether or not channel #x was forwarded from multicast. If not, the method moves to step 49 where the MEP sends a STOP request for channel #x to the Media Server 18. At step 51, the MEP de-queues the JOIN request for channel #x. The method then moves to step 52 where the MEP de-queues the LEAVE request for channel #y, if such a LEAVE request had been entered earlier. However, if it is determined at step 48 that channel #x was forwarded from multicast, the method moves instead to step 53 where the MEP queues a LEAVE request for channel #x at time "NOW+M" seconds. The method then moves to step 52 where the MEP de-queues the LEAVE request for channel #y, if it had been entered before.

The method then moves to step 54 where it is determined whether or not channel #y is available on multicast. If so, the method moves to step 55 where the MEP 17 receives the media data for channel #y from the Multicast Router 27 and forwards the media data over multicast to the STB 11 and Media Client 12. However, if channel #y is not available on multicast, the method moves instead to step 56 where the MEP sends a START request for channel #y to the Media Server 18. At step 57, the MEP receives media data for channel #y over unicast from the Media Server and forwards the data at step 58 to the STB and Media Client. At step 59, the MEP queues a JOIN request for channel #y at time "NOW+N" seconds. At step 61, it is determined whether or not channel #y is available on multicast. If not, the method continues to wait until channel #y is available on multicast. When channel #y is available on multicast, the method moves to step 62 where the MEP stops the unicast connection by sending a STOP request for channel #y to the Media Server. At step 63, the MEP forwards media data for channel #y received over multicast to the STB and Media Client.

Figure 5:
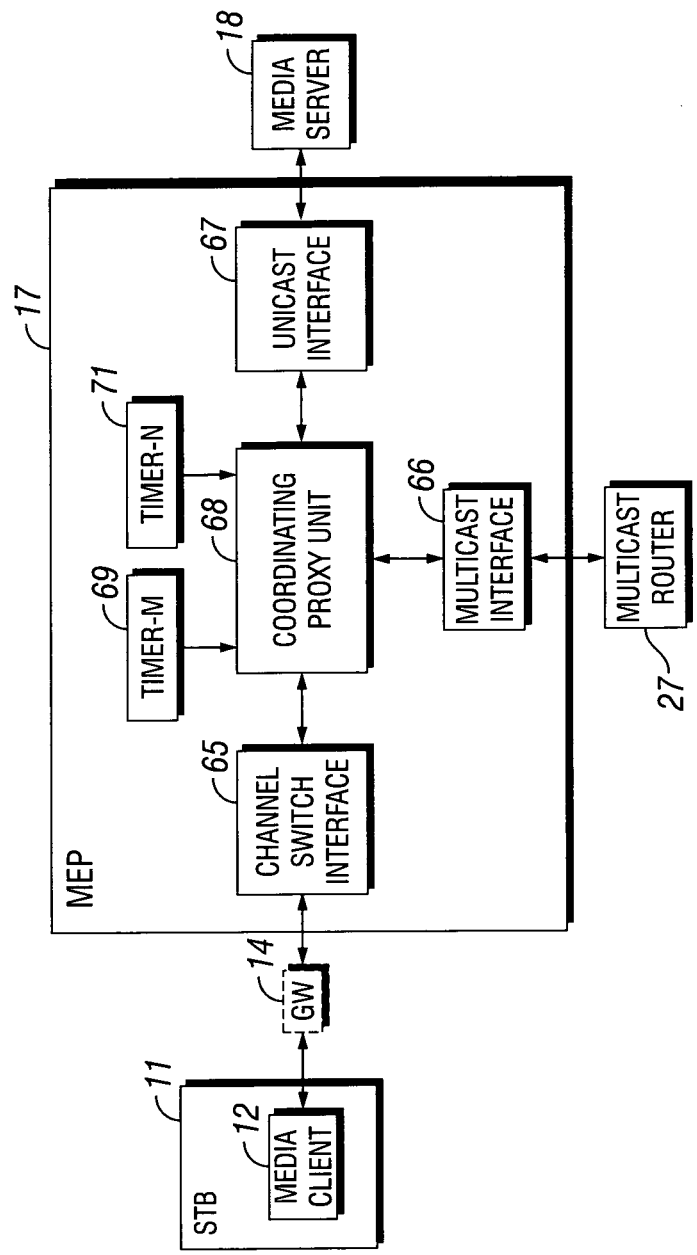
FIG. 5 is a simplified block diagram of a MEP configured in accordance with the present invention.

FIG. 5 is a simplified block diagram of a MEP 17 configured in accordance with the present invention. The MEP includes a channel switch interface 65, a multicast interface 66, and a unicast interface 67. The channel switch interface is for signaling and sending media data to and from the Media Client 12 in the STB 11. The channel switch communications may optionally pass through the Residential GW 14. The multicast interface is for signaling and sending media data to and from the Multicast Router 27 in the aggregation network 16. In one exemplary embodiment, the multicast interface uses IGMP signaling. The unicast interface is for signaling and sending media data to and from the Media Server 18. In exemplary embodiments, the unicast interface uses RTSP or SIP signaling.

Logic in a coordinating proxy unit 68 determines if and when unicast or multicast communications are established with the Media Client 12 in accordance with the flow diagram illustrated in FIG. 4. Inhibit timers Timer-M 69 and Timer-N 71 provide queuing times for JOIN/LEAVE messages when the proxy unit switches from a temporary unicast connection to a multicast connection with the Media Client.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method in a media edge proxy for providing media channels to a media client, said method comprising the steps of:
   receiving from the media client, a request for media data from a first identified media channel;
   obtaining the media data from a media server utilizing a temporary unicast connection;
   entering, in a timer queue, queuing times for JOIN/LEAVE messages when switching from the temporary unicast connection to a multicast router;
   forwarding to the media client, the media data obtained utilizing the temporary unicast connection;
   requesting the media data from the multicast router; and
   upon receiving the media data from the multicast router:
      forwarding to the media client, the media data received from the multicast router; and
      releasing the temporary unicast connection with the media server by queuing a LEAVE request for the temporary unicast connection,
   wherein use of the timer queue prevents the sending of JOIN/LEAVE messages when a user of the media client rapidly changes channels.

2. The method as recited in claim 1, wherein the media channels are Internet Protocol Television (IPTV) channels.

3. The method as recited in claim 1, wherein the media channels are Internet radio channels.

4. The method as recited in claim 1, further comprising setting an initial time period for maintaining the temporary unicast connection, wherein the initial time period is set to a length that prevents the release of the temporary unicast connection when a user of the media client is rapidly changing channels.

5. The method as recited in claim 4, further comprising the steps of:
   receiving from the media client, a request to change to a second identified media channel;
   switching the media client to the second identified media channel; and
   stopping delivery of the media data for the first identified media channel upon the expiration of a second time period after switching the media client.

6. A media edge proxy for providing media channels to a media client, said media edge proxy comprising:
   a channel switch interface for receiving from the media client, a request for media data from a first identified media channel;
   a unicast interface for receiving the requested media data from a media server;
   a multicast interface for receiving the requested media data from a multicast router; and
   a controlling proxy unit connected to the channel switch interface, the unicast interface, and the multicast interface, said controlling proxy unit for:
      obtaining the requested media data from the media server utilizing a temporary unicast connection;
      entering, in a timer queue, queuing times for JOIN/LEAVE messages when the controlling proxy unit switches from the temporary unicast connection to a multicast router;
      forward to the media client, the requested media data obtained utilizing the temporary unicast connection;
      request the media data from a multicast router; and
      upon receiving the media data from the multicast router via the multicast interface:
         forward to the media client, the requested media data received from the multicast router; and release the temporary unicast connection with the media server by queuing a LEAVE request for the temporary unicast connection,
wherein use of the timer queue prevents the sending of JOIN/LEAVE messages when a user of the media client rapidly changes channels.

7. The media edge proxy as recited in claim 6, wherein the media channels are Internet Protocol Television (IPTV) channels.

8. The media edge proxy as recited in claim 6, wherein the media channels are Internet radio channels.

9. The media edge proxy as recited in claim 6, further comprising a first timer for determining an initial time period for maintaining the temporary unicast connection, said initial time period being set to prevent the release of the temporary unicast connection when a user of the media client is rapidly changing channels.

10. The media edge proxy as recited in claim 9, further comprising a second timer for determining a second time period for stopping delivery of the media data for the first identified media channel after switching the media client to a second identified channel.

11. A system for providing requested media data to a media client, said system comprising:
a media server for providing the requested media data from a first identified media channel utilizing a temporary unicast connection;
a multicast router for providing the requested media data utilizing a multicast connection;
a media edge proxy for controlling delivery of the requested media data to the media client, said media edge proxy including:
a unicast interface for receiving the requested media data from the media server utilizing the temporary unicast connection;
a multicast interface for receiving the requested media data from the multicast router utilizing the multicast connection;
a channel switch interface for sending the requested media data to the media client; and
a controlling proxy unit connected to the channel switch interface, the unicast interface, and the multicast interface, said controlling proxy unit for
obtain the requested media data from the media server utilizing a temporary unicast connection;
forward to the media client, the requested media data obtained utilizing the temporary unicast connection;
enter, in a timer queue, queuing times for JOIN/LEAVE messages when the controlling proxy unit switches from the temporary unicast connection to a multicast router;
request the media data from multicast router; and
upon receiving the media data from the multicast router via the multicast interface:
forward to the media client, the requested media data received from the multicast router; and
release the temporary unicast connection with the media server by queuing a LEAVE request for the temporary unicast connection,
wherein use of the timer queue prevents the sending of JOIN/LEAVE messages when a user of the media client rapidly changes channels.

12. The system as recited in claim 11, wherein the media channels are Internet Protocol Television (IPTV) channels.

13. The system as recited in claim 11, wherein the media channels are Internet radio channels.

14. The system as recited in claim 11, wherein the media edge proxy also includes a first timer for determining an initial time period for maintaining the temporary unicast connection, said initial time period being set to prevent the release of the temporary unicast connection when a user of the media client is rapidly changing channels.

15. The system as recited in claim 14, wherein the media edge proxy also includes a second timer for determining a second time period for stopping delivery of the media data for the first identified media channel after switching the media client to a second identified channel.

* * * * *

UNITED STATES PATENT AND TRADEMARK OFFICE
CERTIFICATE OF CORRECTION

PATENT NO. : 8,489,749 B2
APPLICATION NO. : 12/439385
DATED : July 16, 2013
INVENTOR(S) : Horn et al.

Page 1 of 1

It is certified that error appears in the above-identified patent and that said Letters Patent is hereby corrected as shown below:

In the Specification

In Column 3, Line 8, delete "(STBS)" and insert -- (STBs) --, therefor.

In Column 4, Line 10, delete "RSTP" and insert -- RTSP --, therefor.

In Column 4, Line 12, delete "RSTP" and insert -- RTSP --, therefor.

In Column 4, Line 13, delete "RSTP" and insert -- RTSP --, therefor.

In the Claims

In Column 8, Line 3, in Claim 11, delete "for" and insert -- for: --, therefor.

Signed and Sealed this
First Day of April, 2014

Michelle K. Lee
*Deputy Director of the United States Patent and Trademark Office*